(12) United States Patent
Blackham

(10) Patent No.: US 7,663,795 B2
(45) Date of Patent: Feb. 16, 2010

(54) IMAGE DISPLAY APPARATUS WITH NIGHT VISION GOGGLE COMPATIBILITY

(75) Inventor: Geoffrey Howard Blackham, Hassocks (GB)

(73) Assignee: Seos Limited (GB)

( * ) Notice: Subject to any disclaimer, the term of this patent is extended or adjusted under 35 U.S.C. 154(b) by 0 days.

(21) Appl. No.: 10/580,450

(22) PCT Filed: Nov. 5, 2004

(86) PCT No.: PCT/GB2004/004705

§ 371 (c)(1),
(2), (4) Date: May 23, 2006

(87) PCT Pub. No.: WO2005/055616

PCT Pub. Date: Jun. 16, 2005

(65) Prior Publication Data

US 2007/0103768 A1    May 10, 2007

(30) Foreign Application Priority Data

Nov. 28, 2003    (GB) .................................. 0327728.2

(51) Int. Cl.
*G02F 1/00* (2006.01)
*G03B 21/26* (2006.01)
(52) U.S. Cl. ........................................ 359/237; 353/30
(58) Field of Classification Search ................ 359/237, 359/290, 291, 292, 293, 295, 298, 220, 223, 359/224, 320, 339; 353/20, 31, 33, 34, 37, 353/38, 30, 94, 90; 349/5, 7, 8
See application file for complete search history.

(56) References Cited

U.S. PATENT DOCUMENTS

| 4,293,202 | A | 10/1981 | Ohnishi et al. |
| 5,978,142 | A | 11/1999 | Blackham et al. |
| 6,762,785 | B2* | 7/2004 | Roddy et al. ................. 347/239 |
| 2002/0060753 | A1* | 5/2002 | Flint ........................... 348/744 |
| 2003/0081301 | A1* | 5/2003 | Fujii et al. .................... 359/240 |
| 2005/0008374 | A1* | 1/2005 | Taneda ........................ 398/198 |
| 2006/0164443 | A1* | 7/2006 | Kettle et al. .................. 345/690 |
| 2007/0076172 | A1* | 4/2007 | Lerner et al. ................. 353/31 |
| 2008/0247022 | A1* | 10/2008 | Yamauchi et al. ............ 359/211 |
| 2009/0201564 | A1* | 8/2009 | Tian et al. .................... 359/239 |
| 2009/0225234 | A1* | 9/2009 | Ward et al. ................... 348/744 |

FOREIGN PATENT DOCUMENTS

| EP | 1117080 | 7/2001 |
| WO | WO 98/20475 | 5/1998 |

* cited by examiner

*Primary Examiner*—Ricky L Mack
*Assistant Examiner*—Tuyen Q Tra
(74) *Attorney, Agent, or Firm*—Iandiorio Teska & Coleman

(57) ABSTRACT

Image display apparatus (10) comprising projector means, a first light source, at least one primary modulator (12) for modulating light from the first light source, a second light source, optical means (14, 18) for combining light from the second light source with the modulated light from the at least one primary modulator (12), and an auxiliary modulator (16) for modulating the combined light from the second light source and the modulated light from the at least one primary modulator (12).

8 Claims, 3 Drawing Sheets

IMAGE DISPLAY APPARATUS WITH NIGHT VISION GOGGLE COMPATIBILITY

This invention relates to image display apparatus and, more especially, this invention relates to image display apparatus which provides images that can be viewed directly by a user or viewed through night vision goggles by a user.

There is an increasing need for simulators, especially flight simulators, to have displays that provide images that accurately represent daylight out of the window scenes and night scenes, with very low brightness images, which are viewed by the user with the aid of night vision goggles. Present displays are not satisfactory as compromises have to be made.

One approach is to use the display to stimulate night vision goggles worn by the user. For example, in order to stimulate night vision goggles, blood red images are displayed which, although giving a reasonable image when viewed through the night vision goggles give, an unnatural image when viewed directly. The response of night vision goggles to various terrain details, such as high brightness street lamps or the moon, is also unsatisfactory with current displays. The night vision goggles do not respond as they would if used in natural light.

Some simulators use a different approach and employ simulated night vision goggles within the simulator. This requires the image generator to have a separate channel to drive the simulated night vision goggles. It also means that users are unable to use their own night vision goggles within the simulator. The response of these simulated night vision goggles also varies from that of actual night vision goggles.

It is an aim of the present invention to obviate and reduce the above mentioned problems by providing image display apparatus for use in simulation and able to display realistic daylight scenes viewed directly by the user, as well as night scenes viewed directly by the user and night scenes viewed by the user through night vision goggles.

Accordingly, present invention provides image display apparatus comprising projector means, a first light source, at least one primary spatial light modulator for modulating light from the first light source, a second light source, optical means for combining non-modulated light from the second light source with the modulated light from the it least one primary spatial light modulator, and an auxillary spatial light modulator for modulating the combined light from the optical means.

The invention has many advantages over previous methods used to display night scenes in simulators.

The image display apparatus may be one in which the at least one primary modulator comprises a first primary modulator for modulating red light, a second primary modulator for modulating green light, and a third primary modulator for modulating blue light.

The primary and auxiliary modulators may be transmissive light modulators or reflective light modulators.

The image display apparatus may be one in which the first light source has a first spectral content and the second light source has a different spectral content.

The image display apparatus may be one in which the first light source has a spectral content in the visible part of the spectrum and the second light source has a spectral content in the infrared part of the spectrum.

The image display apparatus may be one in which the at least one primary modulator is driven by an output channel from an image generator, and the auxiliary modulator is driven by a separate output channel from the image generator.

The image display apparatus may be one in which the at least one primary modulator is driven by a combination of output channels from an image generator, and the auxiliary modulator is also driven by a combination of output channels from the image generator.

The first light source may be a broadband light source in the visible part of the spectrum. Light from this first light source is modulated by the at least one primary modulator. The optical means combines the modulated light from the primary modulator with light from the second light source and relays this combined light to the auxiliary modulator. The combined light is then modulated by the auxiliary modulator.

The second light source may be a narrow band light source. The second light source may be chosen to be of a wavelength that provides night vision goggles with infrared light of the correct wavelength such that they are stimulated as in the real world.

Light in the visible spectrum, from the first light source, is modulated by both the primary modulator and the auxiliary modulator whereas light from the second light source, in the infrared part of the spectrum, is modulated by the auxiliary modulator only.

Variation of the extent to which the light is modulated by the primary and auxiliary modulators will determine the variation in the images seen by the user. It can be seen that allowing no light to pass through the primary modulator will essentially leave only light from the second light source to be modulated by the auxiliary modulator. If as discussed, the second light source is in the part of the infrared spectrum to which night vision goggles respond, then the image in this case will stimulate the night vision goggles providing accurate night scenes. The image display apparatus is therefore able to be used with actual and not simulated night vision goggles. Users are able to train using their own equipment.

If the primary modulator allows light to pass through, then the auxiliary modulator will be modulating light that has been modulated by the primary modulator, and light from the second light source. This will provide a display that has an image comprising light from the visible part of the spectrum and light from the infrared part of the spectrum. The image in this case will be visible without the aid of night vision goggles.

The combination of visible light and infrared light that is displayed can therefore be carefully controlled by considering the operation of the at least one first modulator and the auxiliary modulator.

In one embodiment of the invention, the image display apparatus is one in which there is only one primary modulator.

The optical means by which the modulated light from the primary modulator is relayed to the auxiliary modulator and combined with the second light source typically consists of a combination lenses and beamsplitters, although mirror relay means can also be used.

In other embodiments of the invention, the image display apparatus has three primary modulators, the three primary modulators comprising a first primary modulator for modulating red light, a second primary modulator for modulating green light, and a third primary modulator for modulating blue light. The optical means used to separate the first light source into red, green and blue components and then recombine the light modulated by the red primary modulator, green modulator and blue modulator can also be used to combine the light from the second light source with the light modulated by the primary modulators.

Other methods for imaging primary modulators onto the auxiliary modulator include optical means comprising refractive and reflective elements.

Embodiments of the invention will now be described solely by way of example and with reference to the accompanying drawings in which.

Figure 1:
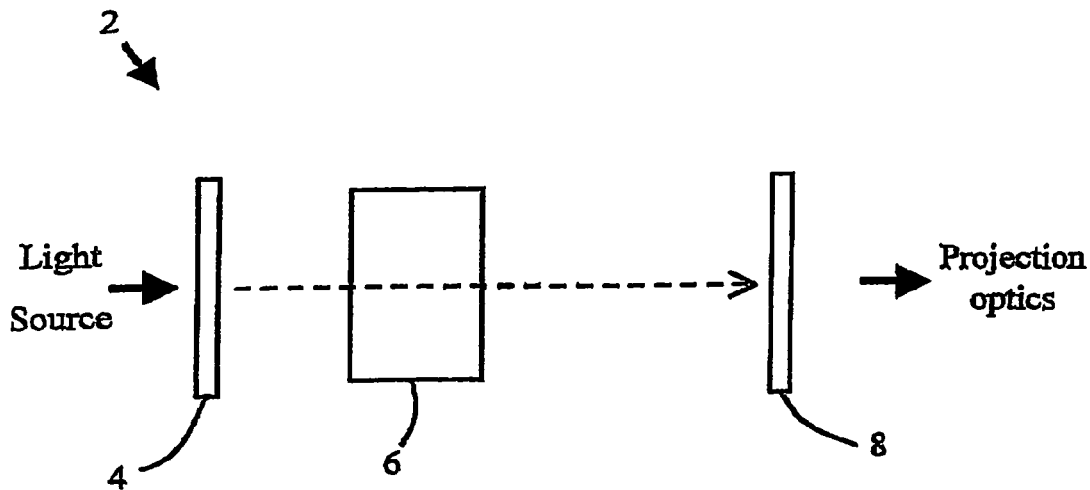
FIG. 1 shows known image display apparatus which has a single light source and modulates light through a primary modulator and an auxiliary modulator.

Referring to FIG. 1, there is shown the optical layout of known image display apparatus 2. The image display apparatus 2 comprises a primary modulator 4 for modulating light from the light source, optical means 6 for relaying the modulated light on a pixel by pixel basis from the primary modulator 4 to the auxiliary modulator 8. The image is then displayed via the projection optics onto a screen. This could be a front projection screen or a rear projection screen. This is disclosed in GB2317290. The modulators in this embodiment are transmissive light modulators. Reflective modulators can also be used.

Figure 2:
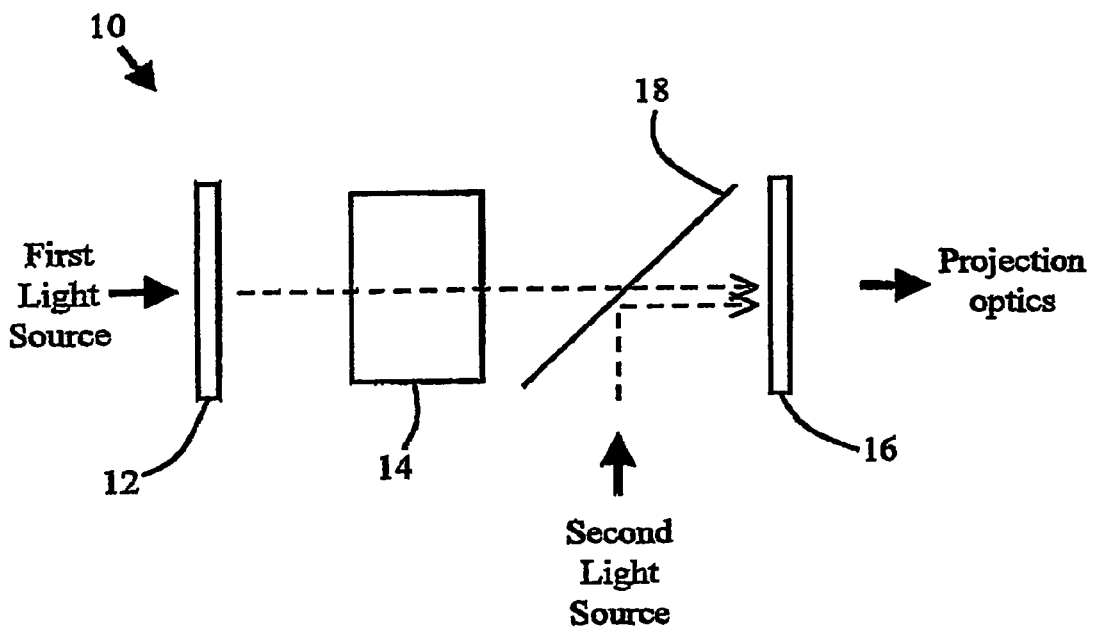
FIG. 2 shows an embodiment of the invention having first and second light sources and primary and auxiliary modulators.

FIG. 2 shows image display apparatus 10 of the present invention. Light from a first light source is incident on the primary modulator 12. Modulated light from the primary modulator 12 is relayed via optical means 14 and 18 to the auxiliary modulator 16. The optical means comprises relay optics 14 and a beamsplitter 18. The beamsplitter 18 allows light from the first light source to pass through to the auxiliary modulator 16. Light from the second light source is reflected by the beamsplitter 18 towards the auxiliary modulator. This auxiliary modulator modulates light which is a combination of light from the first light source, this light having been modulated by the primary modulator and light from the second light source. The first light source and the second light source are chosen such that their wavelengths will provide the desired images when displayed on a screen via the projection optics. The first light source may be a broadband light source in the visible part of the spectrum and the second light source may be a narrow band device, such as a light emitting diode, in the infrared part of the spectrum.

Figure 3:
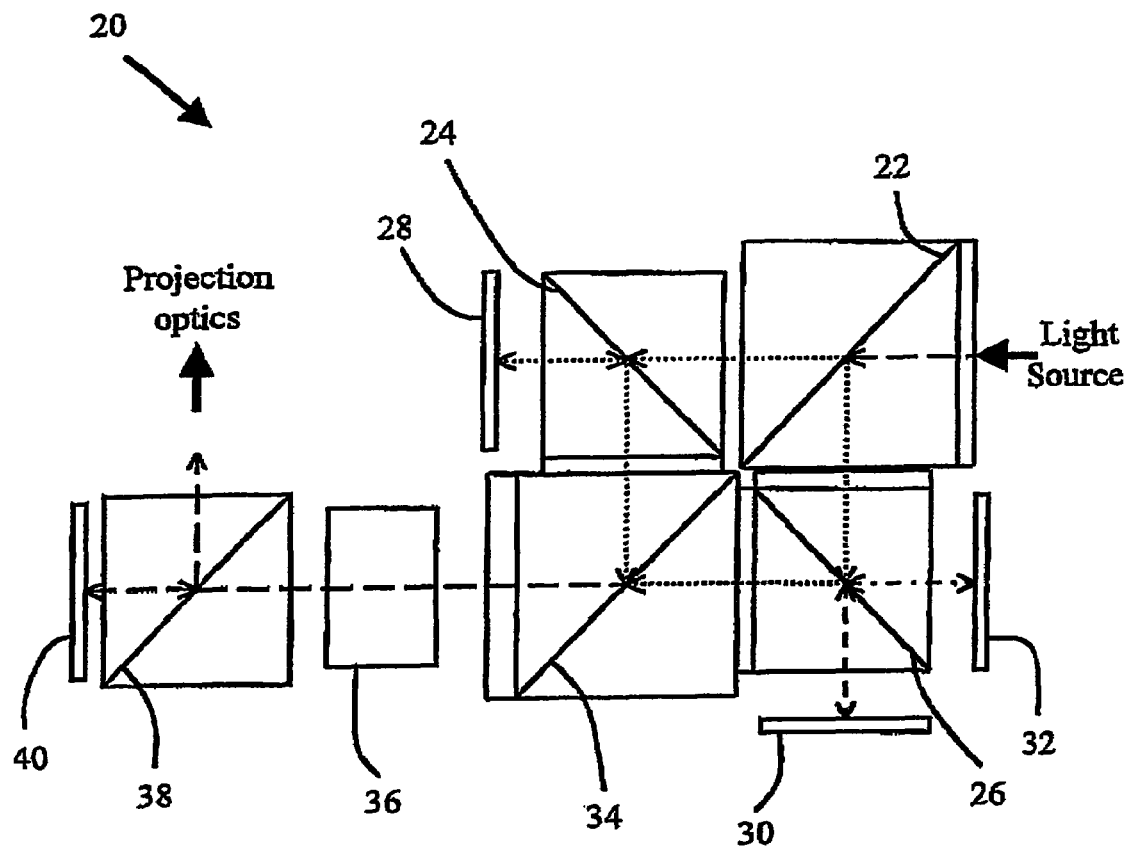
FIG. 3 shows known image display apparatus which has a single light source, red primary modulator, green primary modulator, blue primary modulator and an auxiliary modulator.

FIG. 3 shows known image display apparatus 20 comprising a single light source, a first primary modulator 30 for modulating red light, a second primary modulator 28 for modulating green light, a third primary modulator 32 for modulating blue light, and an auxiliary modulator 40 for modulating the light modulated by the primary modulators. The optical means for splitting the light source into red, green and blue components and recombining the modulated red, green and blue components comprises beamsplitters 22, 24, 26 and 34. Relay optics 36 relays the light to the auxiliary modulator 40 via beamsplitter 38. The primary and auxiliary modulators in this embodiment are reflective type light modulators.

Figure 4:
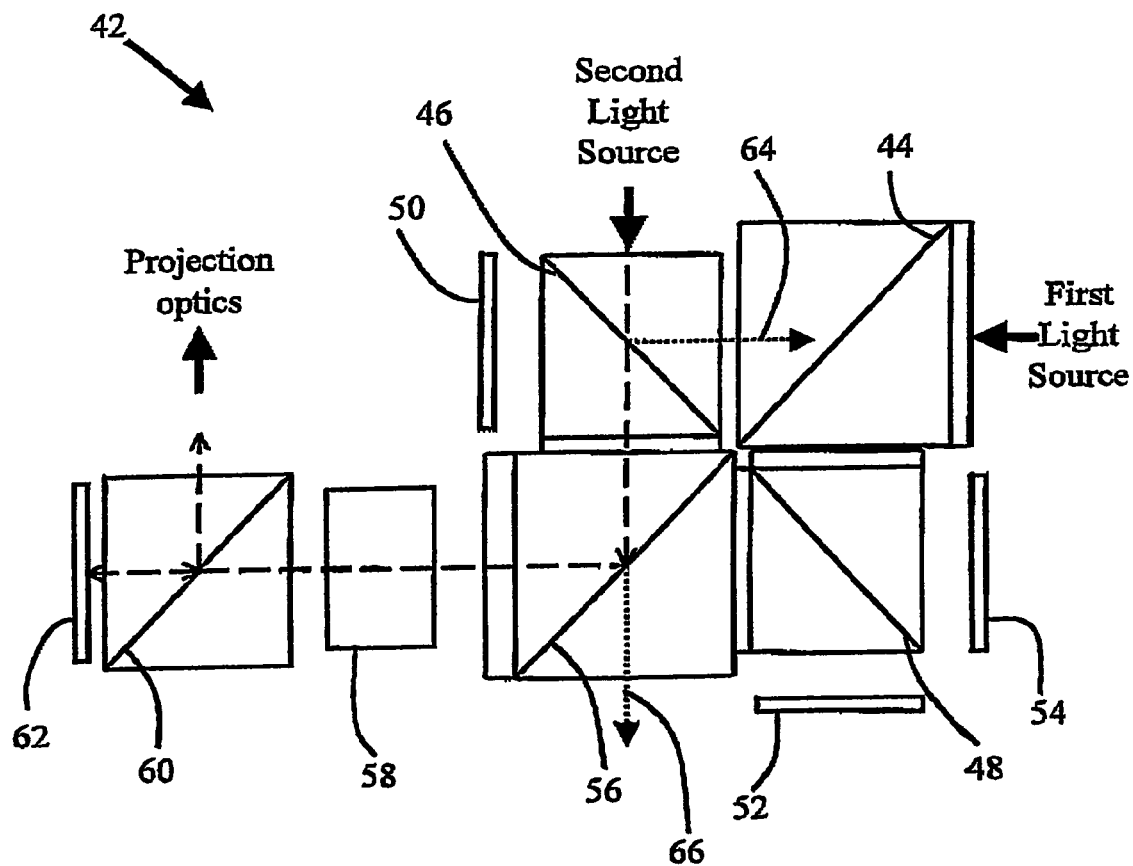
FIG. 4 shows an embodiment of the invention which has a first light source, a second light source, red primary modulator, green primary modulator, blue primary modulator and an auxiliary modulator.

FIG. 4 shows another embodiment of the present invention 42, Light from the first light source is split into component colours and recombined after modulation by the optical means comprising of beamsplitters 44, 46, 48 and 56. First primary modulator 52 modulates red light, second primary modulator 50 modulates green light, and third primary modulator 54 modulates blue light. Light from the second light source is introduced into the optical means on a face adjacent to the second primary green modulator. A portion of light from this second light source is transmitted through beamsplitter 46. The remainder 64 is reflected towards the first light source. This transmitted light is then partially reflected by beamsplitter 56. The remainder will pass through as indicated by path 66. The reflected light is combined with the modulated light from the first light source. This combined light passes via beamsplitter 60 to the auxiliary modulator 62. This auxiliary modulator 62 modulates light from the second light source and light which has been modulated by the three primary modulators 50, 52 and 54. Light from the first light source passes through the optical components as indicted in FIG. 3.

Although the beamsplitters 46 and 56 are designed to transmit and reflect specific wavelengths it can be shown that they will allow a portion of light to pass from the second light source to the auxiliary modulator. The proportion of light transmitted will be dependent on wavelength and therefore the wavelength of light from the second light source can be chosen to optimise this. The first light source may be broadband in the visible spectrum or have specific red, green and blue portions. The second light source is the infrared light source. As it is light from this second light source at infrared wavelengths that will stimulate night vision goggles when used in the display, then, due to the sensitivity of the night vision goggles, this second light source need only be a fraction of the brightness of the first light source which provides the images in the visible range.

The combination of first and second light sources in the invention used with primary and secondary modulators enables images to be displayed either by front projection means or rear projection means that will provide satisfactory images both in the visible range of the spectrum and in a range of the spectrum that will stimulate night vision goggles.

It is to be appreciated that the embodiments of the invention described above with reference to the accompanying drawings have been given by way of example only. Thus for example, some image generators include output channels that provide information in the visible part of the spectrum and also output channels in the infrared part of the spectrum. The primary modulators may be driven with a combination of these channel outputs. The auxiliary modulator may also be driven with a combination of these channel outputs.

The invention claimed is:

1. Image display apparatus comprising projector means, a first light source, at least one primary spatial light modulator for modulating light from the first light source, a second light source, optical means for combining non-modulated light from the second light source with the modulated light from the at least one primary spatial light modulator, and an auxiliary spatial light modulator for modulating the combined light from the optical means.

2. Image display apparatus according to claim 1 in which the at least one primary spatial light modulator comprises a first primary modulator for modulating red light a secondary primary modulator for modulating green light, and a third primary modulator for modulating blue light.

3. Image display apparatus according to claim 1 in which the primary spatial light modulator and the auxillary spatial light modulator are transmissive fight modulators.

4. Image display apparatus according to claim 1 in which the primary spatial light modulator and the auxiliary spatial light modulator are reflective light modulators.

5. Image display apparatus according to claim 1 in which the first light source has a first spectral content and the second light source has a different spectral content.

6. Image display apparatus according to claim 5 in which the first light source has a spectral content in the visible part of the spectrum and the second light source has a spectral content in the infrared part of the spectrum.

7. Image display apparatus according to claim 1 in which the at least one primary spatial light modulator is driven by an output channel from an image generator, and the auxiliary spatial light modulator is driven by a separate output channel from the image generator.

8. Image display apparatus according to claim 1 in which the at least one primary spatial light modulator is driven by a combination of output channels from an image generator, and the auxiliary spatial light modulator is also driven by a combination of output channels from the image generator.

* * * * *